Jan. 15, 1963 D. A. VAN PELT 3,073,073
WIRE ROPE CUTTING ATTACHMENT FOR CHAIN SAWS
Filed March 16, 1961 2 Sheets-Sheet 1

Duane A. Van Pelt
INVENTOR.

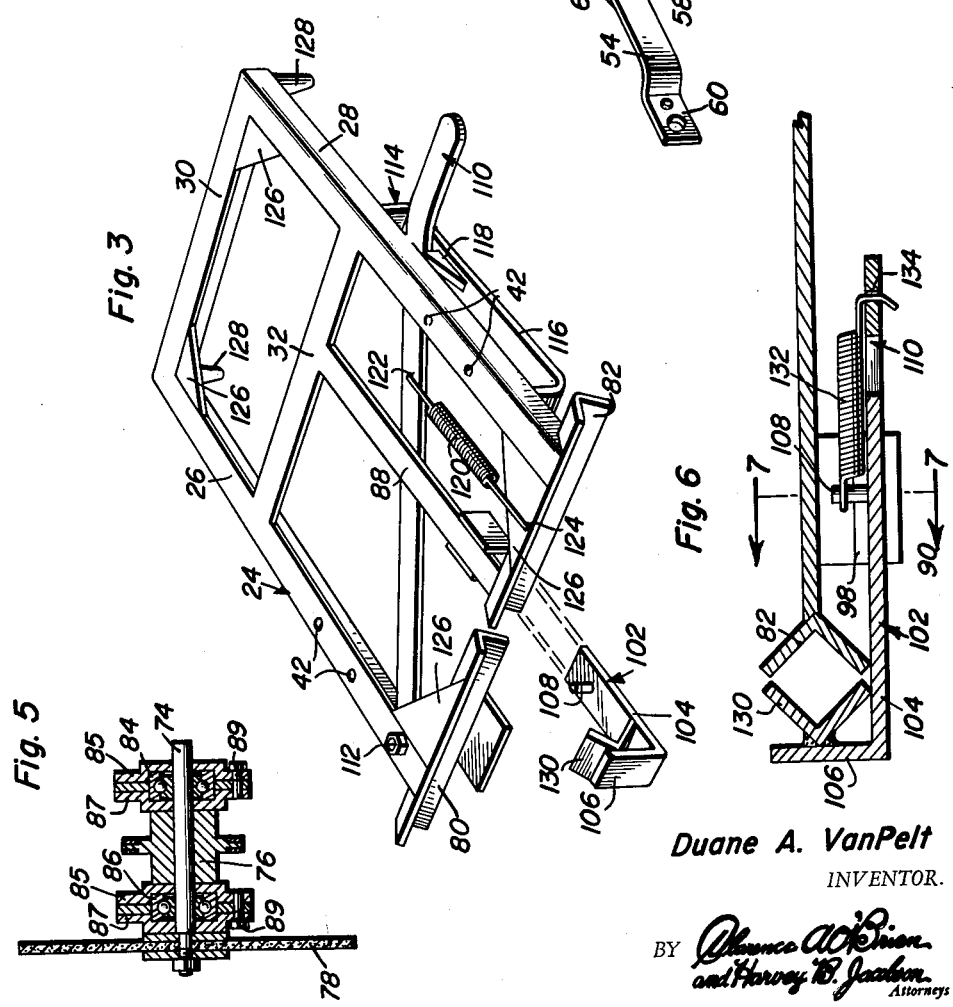

United States Patent Office 3,073,073
Patented Jan. 15, 1963

3,073,073
WIRE ROPE CUTTING ATTACHMENT
FOR CHAIN SAWS
Duane A. Van Pelt, Box 218, Harbor, Oreg.
Filed Mar. 16, 1961, Ser. No. 96,178
5 Claims. (Cl. 51—98)

This invention relates to a novel and useful wire rope cutting attachment specifically adapted for use with portable chain saws. In various types of occupations it is necessary that heavy wire rope be cut to desirable lengths and this wire rope is extremely difficult to cut by conventional methods such as by the use of a hacksaw or the use of a pair of wire cutters. Large diameter wire rope has tremendous strength and because of its strength and its large diameter rope cutters may not readily be used to cut large diameter wire rope with a minimum amount of effort. Additionally, inasmuch as wire rope comprises a great plurality of twisted individual strands of wire, a conventional hacksaw has a tendency to bind in addition to requiring a considerable length of time to cut a section of large diameter wire rope.

Accordingly, the problem of cutting large diameter wire rope has always presented a problem to which there has been in the past no effective solution.

Accordingly, it is the main object of this invention to provide a wire rope cutting attachment for a portable power chain saw which may be adapted to movably mount a portable power chain saw having a cutting wheel journalled on its guide bar and drivingly connected to the prime mover of the power saw and to clampingly engage a length of wire rope and position the wire rope in the path of movement of the cutter wheel journalled on the guide bar of the power chain saw whereby the power chain saw may be moved relative to the length of rope in order that the cutter wheel driven thereby may be used to sever the length of wire rope.

A further object of this invention, in accordance with the immediately preceding objects, is to provide a wire rope cutting attachment adapted to be secured to various types of portable power chain saws.

A final object to be specifically enumerated herein is to provide a wire rope cutting attachment for portable power chain saws which will conform to conventional forms of manufacture, be of simple construction, and easy to operate so as to provide a device that will be economically feasible, long lasting and easy to use in the process of cutting lengths of wire rope.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the wire rope cutting attachment shown with a length of wire rope clampingly engaged therewith and a portable power saw having a cutter wheel journalled on the guide bar thereof and drivingly connected to the engine of the power saw with the portable power chain saw being mounted for movement relative to the portion of the attachment clampingly engaging the length of wire rope in a manner whereby the cutter wheel comprising an abrasive wheel may be moved into engagement with the length of wire rope in order to sever the same;

FIGURE 3 is a perspective view of the wire rope cutting attachment shown with a portion of the attachment by which a length of rope is clampingly secured to the attachment slightly displaced therefrom;

FIGURE 4 is an exploded perspective view of the portion of the attachment by which the chain saw is movably mounted thereon;

FIGURE 5 is an enlarged transverse sectional view taken substantially upon a plane passing through the axis of rotation of the cutter wheel;

FIGURE 6 is a fragmentary enlarged vertical sectional view taken substantially upon a plane passing through the center of the attachment;

FIGURE 7 is a vertical sectional view taken substantially upon the plane indicated by section line 7—7 of FIGURE 6.

Figure 1:
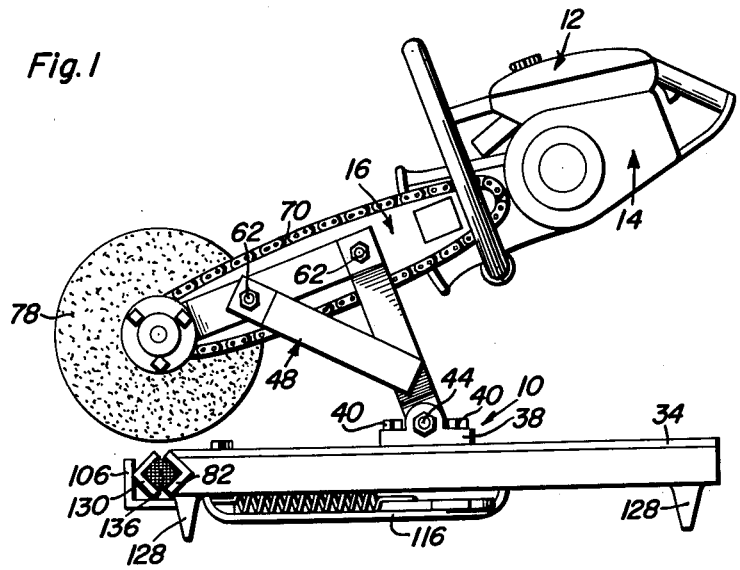

Referring now more specifically to the drawings the numeral 10 generally designates the attachment of the instant invention which is shown having a slightly modified but otherwise conventional portable power chain saw 12 pivotally mounted thereon. The power saw 12 includes a gasoline powered engine generally referred to by reference numeral 14 and a guide bar generally referred to by the reference numeral 16. The guide bar 16 is for the most part of conventional design and is secured to the engine 14 by means of slot 18. The guide bar 16 differs from conventional guide bars in that it is provided with a plurality of mounting apertures 20 and has an outwardly and longitudinally opening notch 22 formed in its outer end.

It will be noted that the attachment 10 includes a generally rectangular frame generally referred to by reference numeral 24 having side members 26 and 28 connected at one end by means of a transverse brace 30. An intermediate transverse brace 32 is also secured between mid-portions of the side members 26 and 28.

Figure 2:
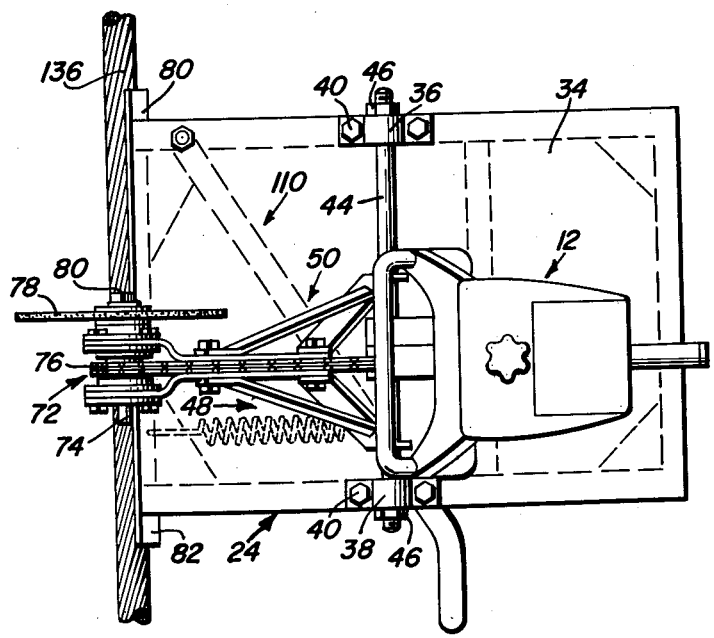
FIGURE 2 is a top plan view of the assemblage illustrated in FIGURE 1 of the drawings.

A mounting and cover plate 34 is secured over the upper surface of the frame 24, see FIGURES 1 and 2 in any convenient manner and a pair of journal blocks 36 and 38 are secured to the frame 24 by means of suitable fasteners 40 secured through the mounting and cover plate 34 and the apertures 42 formed in the side members 26 and 28. The opposite end portions of a pivot shaft 44 are secured through the journal blocks 36 and 38 by means of fasteners 46.

A pair of generally L-shaped supporting arms generally designated by the reference numerals 48 and 50 are provided and each includes a pair of legs 52 and 54. Each pair of legs 52 and 54 are secured together at adjacent ends in any manner at point 56 and by a diagonal brace 58. The ends of the legs 54 remote from the legs 52 are provided with apertures laterally offset portions 60 and it will be noted that L-shaped supporting arms 48 and 50 are secured to opposite sides of the guide bar 16 by means of fasteners 62 secured through the apertures 64 and 66 formed in each of the support arms 48 and 50 which are aligned with the apertures 20 formed in the guide bar 16.

It will be noted that the ends of the legs 52 remote from the legs 54 are suitably apertured as at 68 and that an intermediate portion of the pivot shaft 44 is rotatably journalled through the apertures 68. Further, it will be noted that the legs 52 diverge outwardly from the guide bar 16 whereby the portable power saw 12 is rigidly supported for movement about the pivot shaft 44.

The power saw 12 includes a chain 70 which is drivingly connected to the engine 14. The outer end of the guide bar 16 has an arbor assembly generally referred to by the reference numeral 72 which includes a shaft 74 journalled for rotation about an axis extending transversely of the guide bar 16 by bearing assemblies on the end portions 60 of the support arms 48 and 50. The shaft 74 has a sprocket wheel 76 rigidly mounted thereon about which the endless chain 70 is entrained to drivingly connect the sprocket wheel 76 with the engine 14. One end of the shaft 74 has a cutter wheel in the form of an abrasive wheel 78 mounted thereon by means of fastener 80.

The end of the frame 24 remote from the transverse brace 30 is provided with a pair of elongated longitudinally spaced and aligned brace members 80 and 82 which are substantially V-shaped in cross section. The path of movement of the cutter wheel 78 passes between the adjacent ends of the brace members 80 and 82 and the brace members are disposed relative to the cutter wheel in the path of the latter whereby planes bisecting the apex angle of the brace members 80 and 82 extend generally at right angles to the path of the cutter wheel 78 at its intersection with the longitudinal axes of said brace members.

The laterally offset end portions 60 of the arms 54 provided with bearing assemblies 84 and 86 which rotatably journal the opposite ends of the shaft 74 and the terminal end portions of the shaft 74 project through the apertured end portions 60 of the supporting arms 48 and 50.

The frame 24 also includes a longitudinally extending brace member 88 and a generally U-shaped slide guide assembly 90 depends from the end of the brace member 88 adjacent the brace member 82. The slide guide assembly 90 includes a pair of depending legs 92 and 94 interconnected at the lower ends by means of a bight portion 96. Guide ribs 98 and 100 project inwardly from the legs 92 and 94 respectively.

A clamp member generally referred to by the reference numeral 102 is generally L-shaped in configuration and includes a long leg 104 and a short leg 106. The long leg 104 is slidably received in the slide guide assembly 90 between the bight portions 96 and the guide ribs 98 and 100 and is provided with an upstanding pin 108 on its end remote from the leg 106. The frame 24 has an operating lever generally referred to by the reference numeral 110 pivotally secured thereto by means of a pivot bolt 112 and the end of the operating lever 110 remote from the pivot bolt 112 is slidably disposed in a generally U-shaped guide 114 which depends from the frame 24. The U-shaped guide 114 includes a bight portion 116 having a stop 118 mounted thereon in any convenient manner. The free end of the operating lever 110 is urged toward the brace member 82 by means of an expansion spring 120 having one end engaged in an aperture 122 formed in the operating lever 120 and the other end engaged in an aperture 124 formed in a corner brace 126 of the frame 124. It will be noted that the frame 24 is provided with four corner braces 126. In addition, the frame 24 includes a plurality of depending support legs 128. The upstanding short leg 106 includes a clamp member 130 which is generally V-shaped in cross-section and parallels the brace members 80 and 82. The clamp members and bracing members open toward each other. One end of an expansion spring 132 is engaged with the pin 108, see FIGURE 6, and the other end of the expansion spring 132 is secured through the aperture 134 formed in the operating lever 110.

In operation, the engine 14 is started whereupon the endless chain 70 will rotate the cutter wheel 78. After the length of wire rope 136 has been engaged with the brace members 80 and 82 as illustrated in FIGURES 1 and 2 of the drawings and the clamping member 102 has been moved toward the brace members 80 and 82 by movement of the free end of the operating lever 110 away from the brace member 82 into engagement with the stop member 118 whereby the length of wire rope 136 will be clampingly secured to the frame 24, the portable power saw 12 is pivoted about its axis of rotation established by the pivot shaft 44 to move the cutter wheel 78 into engagement with the length of wire rope 136 in order to sever the latter.

It is to be understood that there are several types of portable power saws now being commercially exploited and that some of these portable power saws are provided with gear wheels or idler wheels on the free ends of the guide bars thereof. If this type of portable power saw is used, it is conceivable that the cutter wheel 78 could be mounted on the free end of its guide bar and that the conventional type of chain could be utilized to drive the cutter wheel 78. In this instance, in order to use the portable power saw for cutting wood it would merely be necessary to remove the cutter wheel 78.

The cutting attachment may also be used to cut reinforcing steel rods, angle iron sections, other metallic products, masonry, and tile, etc. If these other materials are to be cut, it may be necessary to use a different type of cutter wheel. However, the frame and component parts may remain the same.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a chain saw having a cutter wheel journalled on its guide bar and drivingly connected to the prime mover of said chain saw, a wire rope cutting attachment comprising a frame, means mounting said chain saw on said frame for movement of said cutter wheel relative to said frame in a path generally at right angles to the axis of rotation of said cutter wheel, and means carried by said frame adapted to stationarily secure a length of wire rope thereto in the path of movement of said cutter wheel, said mounting means comprising a pair of generally L-shaped support arms each including first and second legs, said guide bar and each of said first legs having a plurality of longitudinally spaced mounting apertures formed therethrough, said first legs being removably secured to opposite sides of said guide bar by means of fasteners secured through registered corresponding ones of said apertures, the free end portions of said first legs projecting forwardly of the forward end of said bar and having an arbor assembly rotatably mounted therebetween by which a sprocket wheel is rotatably supported between said first legs, said cutter wheel being rotatably supported from said arbor assembly, said second legs being generally parallel and projecting laterally and outwardly of said guide bar and pivotally secured to said frame at their free ends for movement about an axis extending transversely of and between said second legs.

2. The combination of claim 1 wherein said securing means includes means adapted to brace a length of wire rope at two points spaced longitudinally therealong, said brace means including a pair of elongated longitudinally spaced and aligned brace members substantially V-shaped in cross-section, said path of said cutter wheel passing between said brace members and the latter each being disposed relative to said cutter wheel and the path of the latter whereby planes bisecting the apex angle of said brace members extend generally at right angles to the path of said cutter wheel at its intersection with the longitudinal axes of said brace members, said securing means including an elongated clamping member substantially V-shaped in cross section and paralleling said brace members, one of said brace members and said clamping member opening toward each other, said clamping engaging means also including means for mounting said clamping member for movement toward and away from said one brace member.

3. The combination of claim 2 wherein said frame includes depending means adapted to engage a supporting surface such as the ground and to support said frame and securing means above said supporting surface.

4. The combination of claim 1 wherein said free end portions of said one legs are oppositely and laterally offset outwardly away from said cutter bar, said arbor assembly including a bearing assembly supported by each of the offset end portions, a transverse shaft having its opposite ends rotatably supported by said bearing assemblies, said sprocket wheel mounted on said shaft for rotation therewith between said bearing assemblies for driving connection with the prime mover of said chain saw by means of its chain, said transverse shaft having an extended end portion projecting through and outwardly of one of said bearing assemblies, and said cutter wheel being mounted on said extended end portion.

5. The combination of claim 4 including diagonal brace means secured between the free end portions of said legs of each of said support arms.

References Cited in the file of this patent

UNITED STATES PATENTS

| | | |
|---|---|---|
| 2,064,017 | Leschen | Dec. 15, 1936 |
| 2,353,590 | Schutz | July 11, 1944 |
| 2,708,468 | Lantz | May 17, 1955 |
| 2,810,409 | Ibelle et al. | Oct. 22, 1957 |
| 2,821,216 | West et al. | Jan. 28, 1958 |